United States Patent [19]

Kino et al.

[11] Patent Number: 4,861,975
[45] Date of Patent: Aug. 29, 1989

[54] VARIABLE FOCUS OPTICAL SYSTEM AND METHOD USING ELECTRO-OPTIC MATERIAL

[75] Inventors: Gordon S. Kino, Stanford; Timothy R. Corle, Menlo Park, both of Calif.

[73] Assignee: The Board of Trustees of the Leland Stanford Junior University, Stanford, Calif.

[21] Appl. No.: 310,027

[22] Filed: Feb. 8, 1989

Related U.S. Application Data

[63] Continuation of Ser. No. 70,791, Jul. 7, 1987, abandoned.

[51] Int. Cl.$^4$ .......................... G01J 1/20; G02B 21/06
[52] U.S. Cl. ..................................... 250/201; 350/509
[58] Field of Search .................. 350/509, 510, 379; 250/201, 203 R; 354/404; 356/352, 358

[56] References Cited

U.S. PATENT DOCUMENTS

| | | | |
|---|---|---|---|
| 3,646,608 | 2/1972 | Rowland | 350/510 |
| 3,914,057 | 10/1975 | Smith et al. | 350/510 |
| 4,445,209 | 4/1984 | Mickleson et al. | 250/201 |
| 4,561,731 | 12/1985 | Kley | 350/510 |
| 4,725,721 | 2/1988 | Nakamura et al. | 250/201 |

Primary Examiner—David C. Nelms
Assistant Examiner—Michael Messinger
Attorney, Agent, or Firm—Flehr, Hohbach, Test, Albritton & Herbert

[57] ABSTRACT

Variable focus optical system in which a light beam is projected through a transparent flat cell of electro-optic material coated on both sides with a layer of transparent conductive material. The layer on one side of the cell is divided into a central disc region and a ring shaped region which surrounds the central region. A lens focuses the light transmitted through the cell at a predetermined distance from the lens. An AC voltage is applied between one of the regions and the layer on the opposite side of the cell to vary the phase of the light passing through that region and focus that portion of the light at a distance which varies periodically with the AC voltage. A reflective surface is positioned at the distance from the lens where the unshifted light is focused, and a detector receives the light reflected from the reflective surface and provides an output signal indicative of the position of the surface.

7 Claims, 3 Drawing Sheets

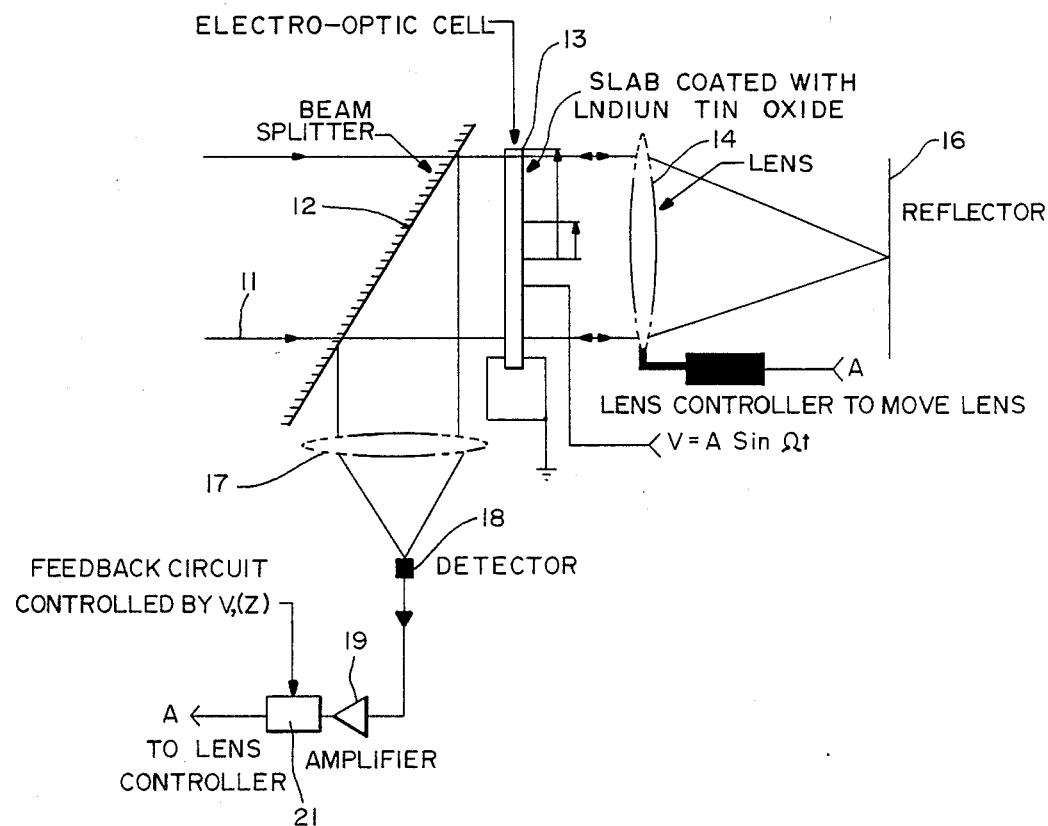
FIG.—1

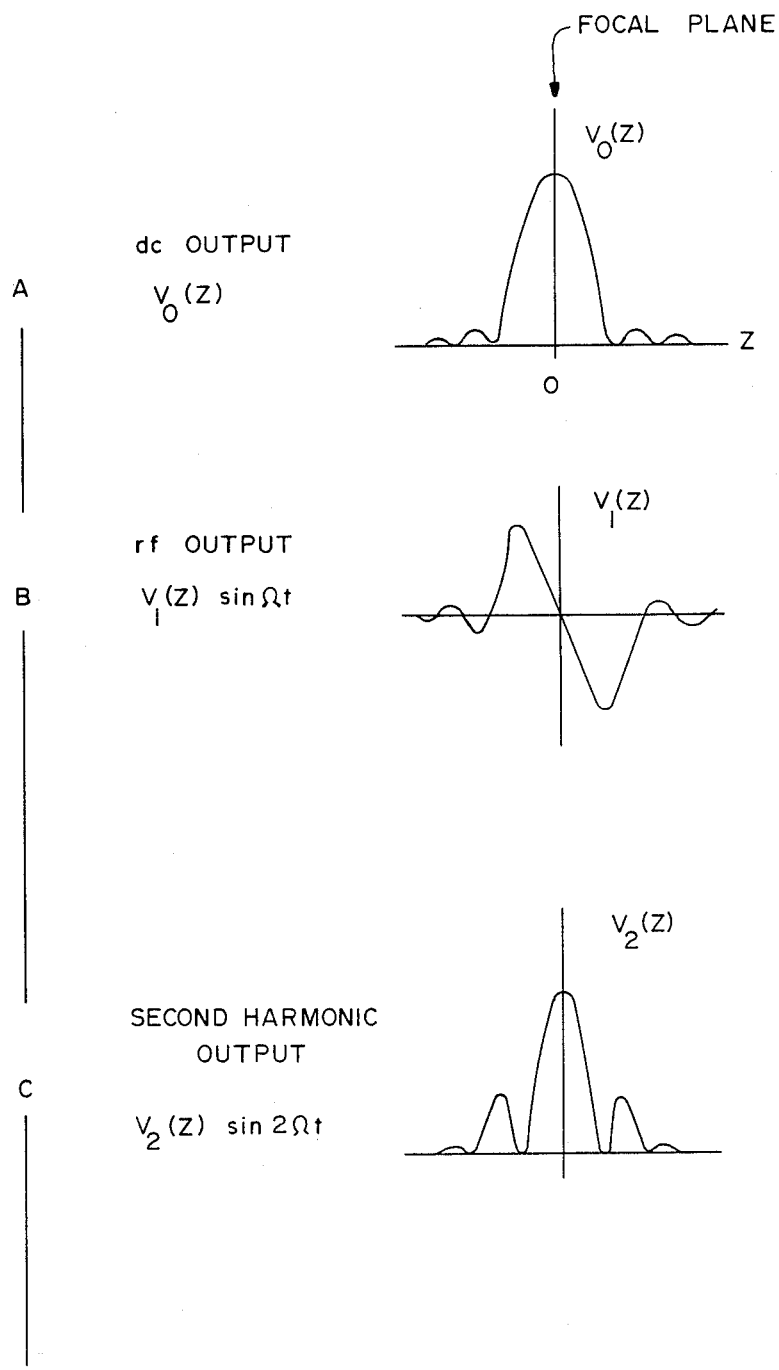
FIG.—2

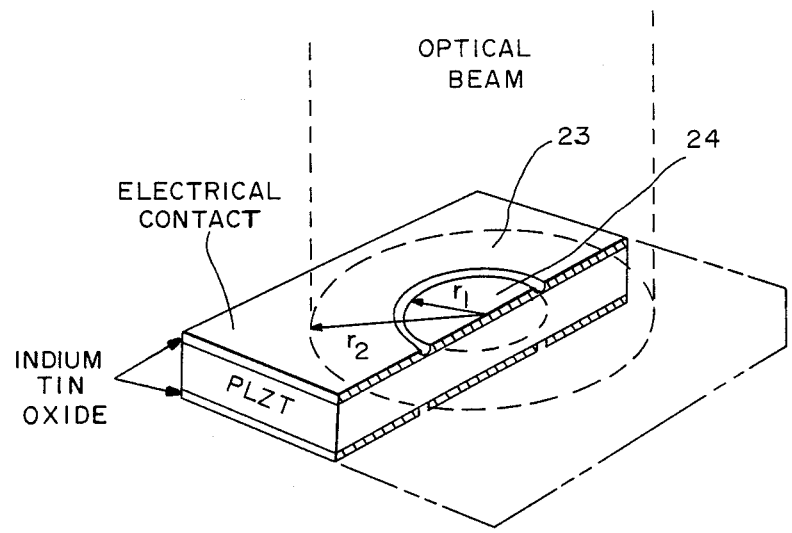
FIG.—3
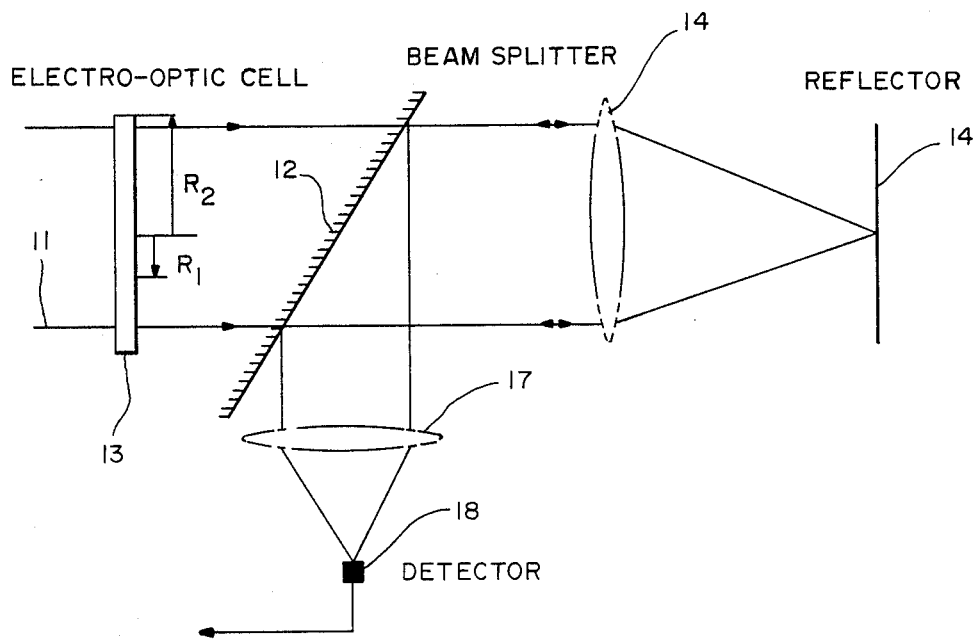
FIG.—4

VARIABLE FOCUS OPTICAL SYSTEM AND METHOD USING ELECTRO-OPTIC MATERIAL

This is a continuation of application Ser. No. 070,791 filed July 7, 1987, now abandoned.

FIELD OF THE INVENTION

This invention relates generally to a variable focus optical system and more particularly to an optical system for determining the location of reflecting surfaces.

DESCRIPTION OF RELATED ART

Non-contact, optical measuring probes are known. U.S. Pat. No. 3,567,320 describes a measuring probe in which a light beam is passed through a pinhole and focused on the surface of an object. A color disbursing plate provides different wavelength components so that the illumination of one color, long wavelength, is focused at a greater distance than the average and another color, short wavelength, is focused at a shorter distance. The reflections from the surface are returned through the same lens through beam splitters to detectors. One detector is filtered to receive short wavelength light and the other detector is filtered to receive the long wavelength light. The detector outputs are compared to give an indication of the location of the reflecting surface.

In second embodiment the pinhole is oscillated to change the focal length of the beam. Only one detector is used and the detector output is compared in phase with the voltage applied to oscillate the pinhole.

The Zernike phase contrast microscope was developed some years ago. The basic idea of this microscope was to place a transparent plate in the back focal plane of a lens. In one form of the microscope, when used for reflective imaging, the center region of this plate is coated with a transparent film as to cause the path length of the rays passing through that region to differ by a quarter wavelength from the path length of the rays passing through the other region. This makes it possible to obtain a phase contrast image since the image intensity now depends on the phase difference between the outer rays and the inner rays. An image is obtained whose intensity depends upon the difference in phase of the signals passing through the inner and outer regions of the lens. The phase differences depended on the position of the surface of the object being observed. Phase contrast images of topography are obtained.

A problem with the prior art microscope is that the traverse definition is poor because of side lobes, i.e., the signals received from points away from the focus tend to dominate the signal. It is also difficult to use the device for quantitative measurements.

SUMMARY OF THE INVENTION

The present invention is directed to a new optical system and technique for making accurate range measurements with good transverse definition. The optical system of the present invention has provided a means for measurement of profile and thickness of transparent or opaque films such as found in integrated circuits. On a more microscopic scale, the technique can be used in robots to position sensors and for measuring profiles of machine parts to which no direct contact need be made.

It is an object of the present invention to provide an optical system and method of phase contrast imaging which provides better sensitivity and definition.

It is another object of the present invention to provide an optical system and method for determining the position of the focal point with improved accuracy.

The foregoing and other objects of the invention are achieved by a system which projects a light beam through a transparent flat cell of electro-optic material coated on both sides with a layer of transparent conductive material. The layer on one side of the cell is divided into two parts: a central disc surrounded by a ring shaped region. A lens focuses the transmitted light at a predetermined distance. A voltage is applied between the outer ring region and the layer on the opposite side to thereby change the phase of the light transmitted through this part of the cell. The net result is that aberrations are introduced which focus the light at a different distance from the lens, a distance which depends upon the applied voltage. A point detector is provided for sensing the reflected light and providing an output signal indicative of position of the surface from which the light is reflected.

BRIEF DESCRIPTION OF THE DRAWINGS

The foregoing and other objects of the invention will be more clearly understood from the following description taken in connection with the accompanying drawings of which:

FIG. 1 is a diagram showing an optical phase contrast system in accordance with one embodiment of the present invention.

FIGS. 2A, 2B and 2C show the detector outputs.

FIG. 3 shows the electrode structure of the transparent flat cell.

FIG. 4 shows another embodiment of the present invention.

DESCRIPTION OF THE PREFERRED EMBODIMENTS

Referring to FIG. 1, a collimated light beam 11 which may be formed by a laser and a lens system, is transmitted through a beam splitter 12 through a electro-optic cell 13 through a focusing lens 14 and focused onto a reflective surface 16. The light reflected at the surface is gathered by the lens 14, passes through the electro-optic cell and is reflected by the beam splitter onto a lens 17 which focuses the light onto a point detector 18. The output of the detector is amplified by an amplifier 19 and fed through a phase comparator 21.

The output of the detector includes a DC component, FIG. 2A, an AC component, FIG. 2B and an AC component at the second harmonic, FIG. 2C. The outputs will have the shape shown in FIGS. 2A, 2B and 2C when a plane reflector is scanned axially through the focal plane and an AC voltage phase modulates the light passing through the cell.

It should be noted that the light beam 11 need not be collimated or generated by a laser. If the light beam is not collimated, such as from an ordinary microscope condenser assembly, many points on the reflector are illuminated simultaneously. The image formed by this array of points may then be imaged on an array of detectors, such as a CCD camera at 18. If a temporally incoherent (broad band) light source is used, a point detector is no longer required to generate the responses shown in 2A, 2B and 2C.

The electro-optic cell comprises a transparent electro-optic material coated with a transparent conductive layer on one side is formed to include an outer encircling portion 23 and an inner disc shaped portion 24, FIG. 3. When an AC voltage A sin it is applied to the outer portion, the phase of the output light varies in accordance with the applied voltage.

The variable focus optical system described is a modified Zernike phase contrast microscope. It utilizes modern electronic techniques to eliminate some of the difficulties discussed above, and offers other advantages. With this optical system, the phase delay of the rays passing through the center varies with the applied voltage. In one form of electro-optic crystal, PLZT, he phase change is linearly proportional to the applied voltage; in another, using a second form of PLZT, the phase change varies as the square of the applied voltage. For simplicity, we shall use as an example the material with a phase change linearly proportional to voltage. When the form of PLZT which has a phase change varying as the square of the applied field is used, a DC potential along with an AC potential must be used to obtain the same results as with the linear electro-optic material. Typically, the PLZT is 1 mm thick and the transparent films are of the order of 1000A thick.

The advantage of placing the phase plate on the lens side of the beam splitter, as shown in FIG. 1, is that, for a given applied voltage, the total phase shift of the transmitted and reflected beam is double that of the alternative system with the phase plate on the other side of the beam splitter, FIG. 4. The disadvantage is that reflections from the plate can deteriorate the performance of the system.

As described, the transparent conducting film, indium tin oxide, is divided into two parts, a center region in the shape of a disc, approximately 0.7 of the diameter of the total beam aperture, and an outer region in the shape of an annulus which is electrically separated from the inner region.

The regions are shaped as in FIG. 3. An rf signal A sin it is applied to the outer electrode. Typically, the frequency of this rf signal can be in the range of a few hertz to several tens of megahertz. The high-frequency limit is dictated by the capacitance of the device, the low-frequency limit by noise considerations.

When an rf signal is applied to the center or outer electrode, the phase of the signal passing through this electrode varies as A sin To. Thus, the phase of the rays near the center of the microscope objective lens is changed relative to the phase of those on the outside. When the beam is focused on a reflecting object (z=0), and there is no rf signal applied, the dc output is $V_0(z)$ and maximum. Under these conditions, small changes in the potential of the center or outer electrode will change the phase of the rays passing through this region so that the phase is linearly proportional to the voltage applied. The output obtained from the detector is of the form $$V = |A_0 + A_1 e^{j\Phi}|^2$$

where $A_0 + A_1$ are constants which depend on the areas of the two electrodes, and $\Phi$ is the phase change due to the applied voltage, which for small applied voltages is linearly proportional to the voltage.

If the beam is defocused by a distance z, the output signal obtained can be written in the form $$V = A_0^2 + A_1^2 + 2A_0 A_1 \cos(\Phi + \Delta kz)$$

where $\Delta$ is a constant of the order of unit, $k = 2\pi/\lambda$ is the wave number, and $\lambda$ is the optical wavelength. This expression for the output voltage can be written in the form $$V = A_0^2 A_1^2 + 2A_0 A_1 \cos\Phi \cos\Delta kz - 2A_0 A_1 \sin\Phi \sin(\Delta kz)$$

For $\Delta kz$ small, it follows that $$V = A_2^2 + A_1^2 + 2A_0 A_1 \cos\Phi - 2A_0 A_1 \Delta kz \sin\Phi - A_0 A_1 (\Delta kz)^2 \cos\Phi$$

It will be seen that there is one term in this expression which depends linearly on the defocus distance z. In this case, as the phase is changed by an applied voltage, the voltage at the detector becomes a maximum where $\Delta kz = -\cot\Phi$. Thus, the dependence of the point where the output signal from the detector is maximum, i.e., the position of the focal point changes with voltage since the phase $\Phi$ is proportional to the applied voltage.

More generally, when an rf potential of the form $V = A \sin\Omega t$ is applied to the center or outer electrode, the focal point moves in and out periodically at a frequency $\Omega$. There are other higher harmonic components present as well. As shown in FIG. 2A, DC and second harmonic output terms are obtained of the form $V_0(z)$ and $V_2(z) \sin 2\Omega t$, which pass through a maximum at $z=0$, the focal point, while an rf output term of the form $V_1(z) \sin\Omega t$ is obtained, which passes through zero at the focal point. The value of $V_1(z)$ exhibits maxima at positions on each side of the focus, as illustrated in FIG. 2B.

We note that $V_1$ reverses in sign as the sign of z changes. The system, therefore, enables us to measure the position of the focal point with good accuracy by determining where the rf output is zero. We can also tell on which side of the focal point the reflector is placed by measuring the sign of the rf potential from the detector output.

The system can be used to obtain an accurate measurement of position. It can also be used with a feedback circuit, as shown in FIG. 1, to control the position of the lens so as to make certain that it is always focused on the reflector. This technique is different from that of a standard self-focusing camera. Such a camera uses methods which depend on measuring the sharpness of the image, i.e., it looks at the sharp edges in the image. In the system described here, sharp edges in the object are not needed and a plane reflector can be observed. Thus, the device is useful for measuring the profiles of semiconductors, for measuring the thickness of thin optical films, by determining when the beam is focused on the top and bottom of the film, and for range sensing using a camera lens to observe flat and curved objects some distance from the lens. Because of the differential output obtained in the form of an rf signal, in range measuring the accuracy is extremely good. For example, the accuracy is of the order of an Angstrom when microscope lenses are employed. Using camera lenses, the accuracy is of the order of 10 μm at a distance of 10-20 cm in this application.

We have used these techniques on rough surfaces as well as smooth. The results are the same, except for the lower intensity of the reflected light.

We claim:

1. A variable focus optical system comprising means projecting a light beam; a transparent cell of electro-optic material coated on both sides with a layer of transparent conductive material, with the layer on one side divided into at least two parts: a central disc surrounded by a ring-shaped region; a lens focusing the light transmitted through said cell at a predetermined distance; and means for applying an a-c voltage between said central disc or outer region and the layer on the other side to thereby change the phase of the light transmitted through the central disc with respect to the surrounding ring to focus the light transmitted through said disc or region at a distance which moves in and out periodically with respect to the light transmitted through said region or disc at the frequency of said a-c voltage.

2. A variable focus optical system as in claim 1 in which a reflective surface is located at said predetermined distance and means including a detector receives light reflected from said surface and provides an output signal including a-c components.

3. A variable focus optical system as in claim 2 in which the output of said detector is processed to provide an output signal indicative of the position of said reflecting surface with respect to the position of the focus of the light from the other region of the cell.

4. A variable focus optical system comprising means for projecting a light beam; a beam splitter for receiving and passing said light beam; a transparent cell of electro-optic material coated on both sides with a transparent conductive material, with the layer on one side including an inner region and at least an outer surrounding region disposed to transmit said beam; a lens focusing said light at a predetermined distance; means for applying an a-c voltage between said center or outer region and the opposite side of the cell to periodically change the phase of the light passing through said region to periodically change the phase of the light passing through said region to periodically change the focal point; said lens receiving light reflected from an object disposed at the focus of said lens and directing it to said beam splitter; a detector for receiving light reflected from said beam splitter and providing an output signal including a-c components representative of the location of the surface with respect to the focal point of the beam and means for determining when the a-c signal passes through zero.

5. A variable focus optical system as in claim 4 in which the electro-optic cell is disposed to receive the light prior to the beam splitter.

6. A variable focus optical system as in claim 4 in which the electro-optic cell is disposed to receive the light passing through said beam splitter and the light reflected from the surface.

7. A variable focus optical system comprising:
means projecting a light beam;
a transparent cell of electro-optic material coated on both sides with a layer of transparent conductive material, with the layer on one side divided into at least two parts: a central disc surrounded by a ring-shaped region;
a lens focusing the light transmitted through said cell at a predetermined distance;
means for moving said lens in response to a control voltage;
means for applying an a-c voltage between said central disc or outer region and the layer on the other side to thereby change the phase of the light transmitted through the central disc with respect to the surrounding ring to focus the light transmitted through said disc or region at a distance which moves in and out periodically at the frequency of the a-c voltage;
a detector for receiving light reflected by an object which receives said focused light and providing an output signal;
means for receiving the output signal and determining when the signal passes through zero and for measuring the sign of the signal when it is not zero and providing a control signal; and
means for receiving said control signal and providing the control voltage for said lens positioner.

* * * * *

UNITED STATES PATENT AND TRADEMARK OFFICE
CERTIFICATE OF CORRECTION

PATENT NO. : 4,861,975

DATED : August 29, 1989

INVENTOR(S) : Gordon S. Kino, et al.

It is certified that error appears in the above-identified patent and that said Letters Patent is hereby corrected as shown below:

At column 1, line 4, insert --This invention was made with Government support under Contract No. AFOSR-84-0063 awarded by the Department of the Air Force. The Government has certain rights in this invention.--

Signed and Sealed this

Fourth Day of April, 1995

*Attest:*

BRUCE LEHMAN

*Attesting Officer*     *Commissioner of Patents and Trademarks*